US012710066B2

(12) United States Patent
Urhe et al.

(10) Patent No.: US 12,710,066 B2
(45) Date of Patent: Aug. 18, 2026

(54) RING JOINT ASSEMBLY FOR CONNECTING OBJECTS ON SAME OR DIFFERENT PLANES AND A SYSTEM THEREOF

(71) Applicants: Abhijeet Urhe, Pune (IN); Uma Gadsing, Pune (IN)

(72) Inventors: Abhijeet Urhe, Pune (IN); Uma Gadsing, Pune (IN)

( * ) Notice: Subject to any disclaimer, the term of this patent is extended or adjusted under 35 U.S.C. 154(b) by 301 days.

(21) Appl. No.: 18/709,041

(22) PCT Filed: Apr. 29, 2023

(86) PCT No.: PCT/IB2023/054490
§ 371 (c)(1),
(2) Date: May 10, 2024

(87) PCT Pub. No.: WO2023/214281
PCT Pub. Date: Nov. 9, 2023

(65) Prior Publication Data

US 2025/0003437 A1 Jan. 2, 2025

(30) Foreign Application Priority Data

May 3, 2022 (IN) ............................ 202221025749

(51) Int. Cl.
*F16B 9/00* (2006.01)

(52) U.S. Cl.
CPC .................................... *F16B 9/054* (2018.08)

(58) Field of Classification Search
CPC ........... F16B 9/054; F16B 37/045; F16L 3/16; Y10T 403/32262; Y10T 403/32155; Y10T 403/32377
See application file for complete search history.

(56) References Cited

U.S. PATENT DOCUMENTS 684,451 A * 10/1901 Mowry .................. F16C 11/06 248/346.06
1,016,720 A * 2/1912 Vondracek ........... A46B 5/0075 30/169

(Continued)

*Primary Examiner* — Daniel J Wiley
(74) *Attorney, Agent, or Firm* — Kevin J Fournier Intellectual Property Legal Services Ltd; Kevin J Fournier

(57) ABSTRACT

A ring joint assembly, having a ring (10) having a peripheral slot (10A) and a circular slot (10B), a support plate (20) having a circular slot (20A), a hexagonal nut (30), a washer (40) and at least two solid bolts (50) of head (50A) or at least two hollow bolts (60) of head (60A) or at least one solid bolt (50) and one hollow bolt (60), is disclosed. A rigid connection, with a thing, is made through the circular slot (10B) of the ring (10), in conjunction with the washer (40), the hexagonal nut (30) and the solid bolt (50) or hollow bolt (60), as the case may be, and a movable connection, with a second thing, is made through the peripheral slot (10A) of the ring (10), in conjunction with the circular slot (20A) on the support plate (20), the washer (40), the hexagonal nut (30) and the solid bolt (50) or hollow bolt (60), as the case may be. The movable connection provides flexibility and easy adjustment of the connection so formed. The placement of the head (50A) of solid bolt (50) or head (60A) of hollow bolt (60) may be inside or outside of the ring (10), depending upon the availability of space, purpose of coupling, the things that need to be coupled together, etc. A ring joint assembled system, wherein multiple ring joint assemblies, connect, in series, more than two things with each other via said ring joint assemblies is disclosed.

7 Claims, 8 Drawing Sheets

(56) References Cited

U.S. PATENT DOCUMENTS

| | | | | | |
|---|---|---|---|---|---|
| 1,578,634 | A * | 3/1926 | Borgmann | F16L 3/00 | 248/299.1 |
| 1,761,465 | A * | 6/1930 | Chappelow | A01B 35/26 | 172/742 |
| 2,594,242 | A * | 4/1952 | Wilson | F21V 21/26 | 403/112 |
| 2,641,513 | A * | 6/1953 | Fryda | B25G 3/38 | 15/144.1 |
| 3,145,005 | A * | 8/1964 | Wester | F16B 9/056 | 248/314 |
| 3,204,898 | A * | 9/1965 | Manning | B63B 17/04 | 411/959 |
| 4,928,930 | A * | 5/1990 | Chung | E04F 11/1834 | 403/116 |
| 5,322,255 | A * | 6/1994 | Garrett | H04R 1/08 | 348/E7.079 |
| 5,437,433 | A * | 8/1995 | Rezek | E04F 11/1834 | 256/67 |
| 5,653,546 | A * | 8/1997 | Cronkhite | E04H 17/1413 | 403/123 |
| 6,273,390 | B1 * | 8/2001 | Meyer | E04H 12/2215 | 52/165 |
| 7,543,788 | B2 * | 6/2009 | Herb | F16L 3/16 | 248/299.1 |

* cited by examiner

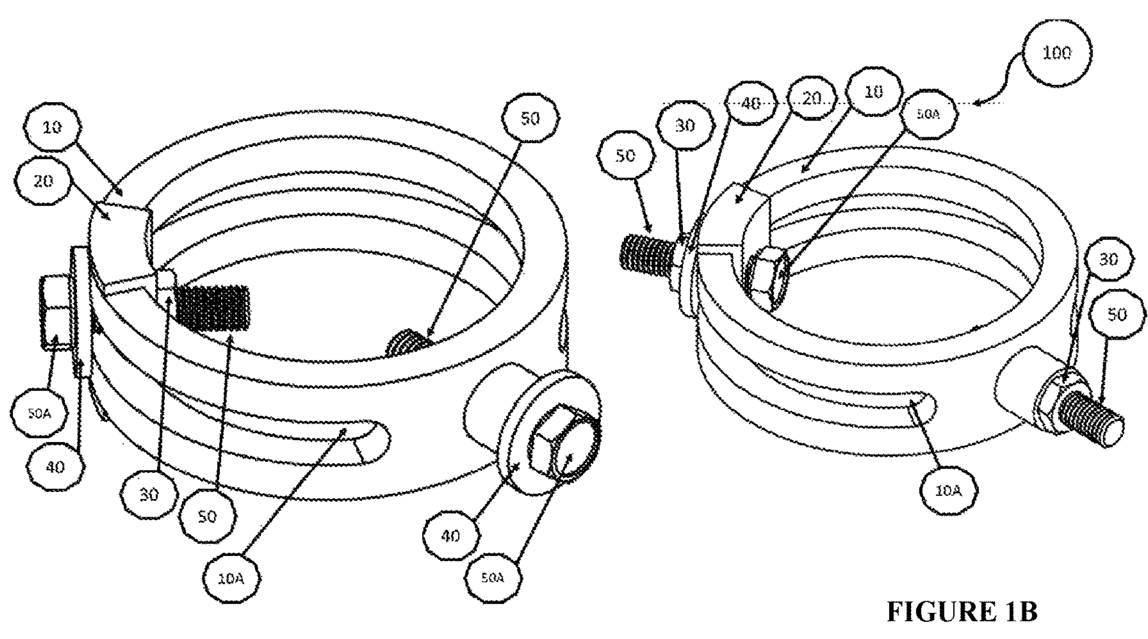
FIGURE 1A
FIGURE 1B
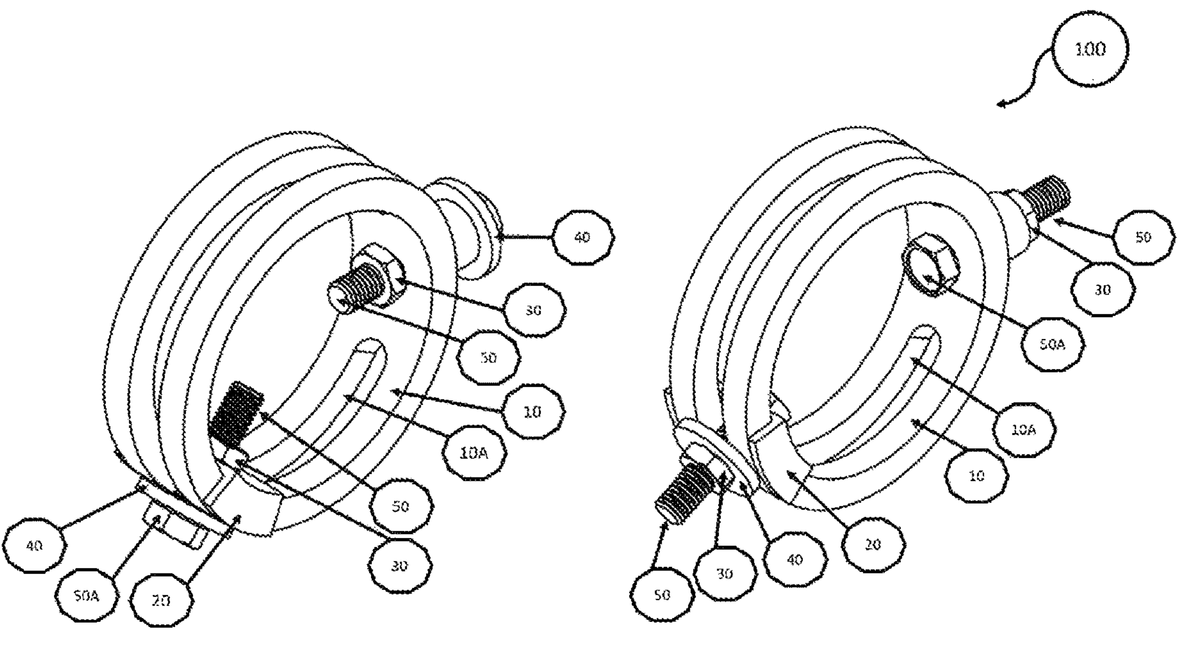
FIGURE 2A
FIGURE 2B

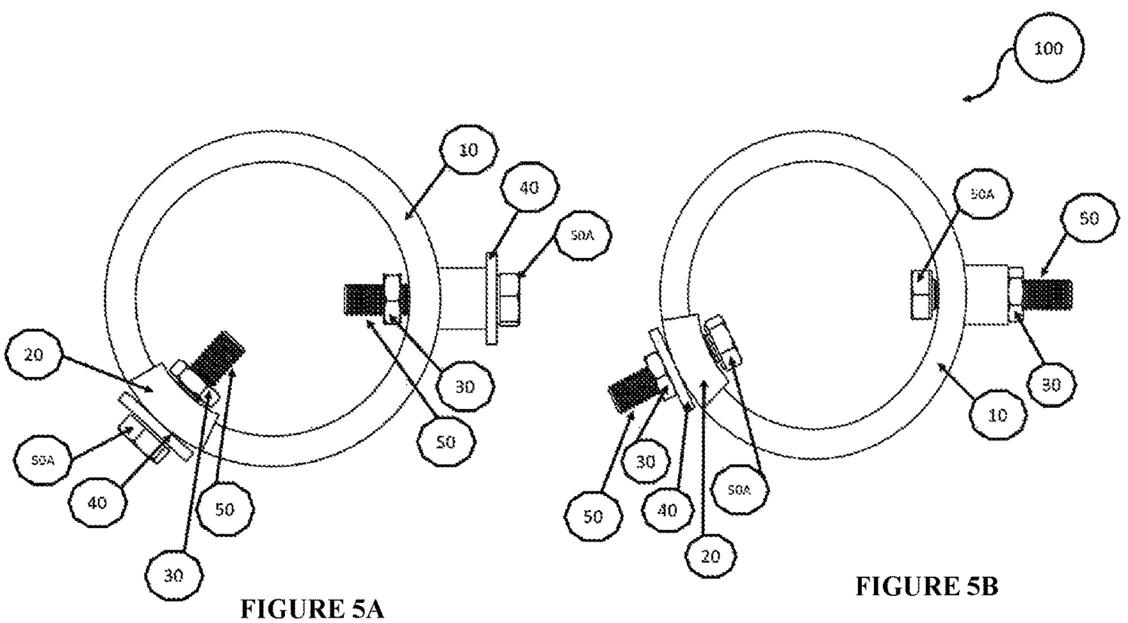
FIGURE 5A
FIGURE 5B
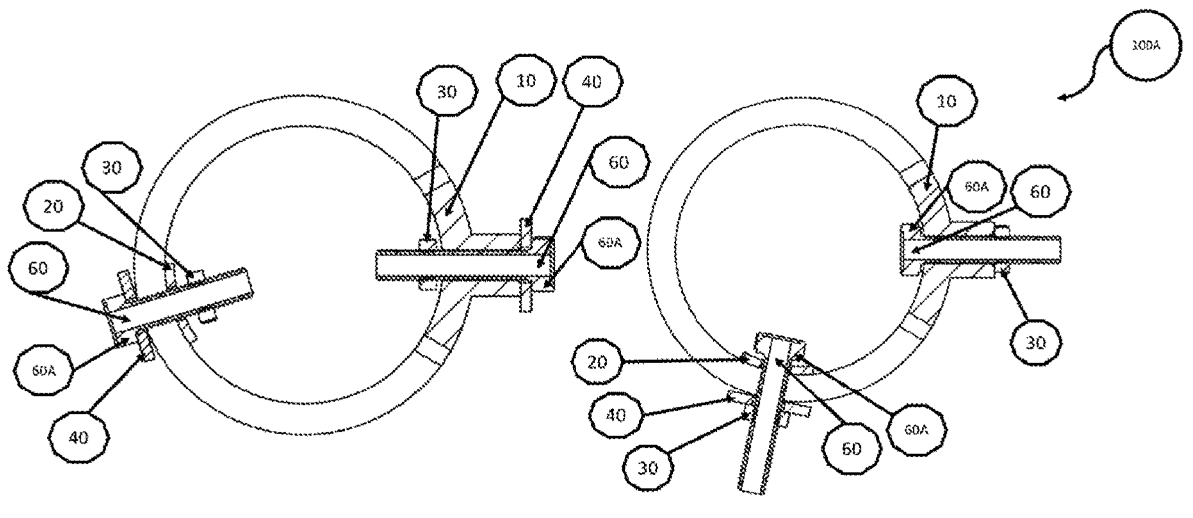
FIGURE 6A
FIGURE 6B

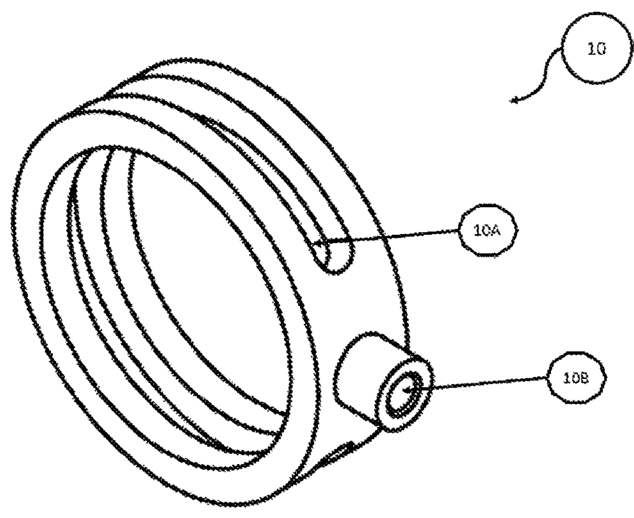
FIGURE 7A
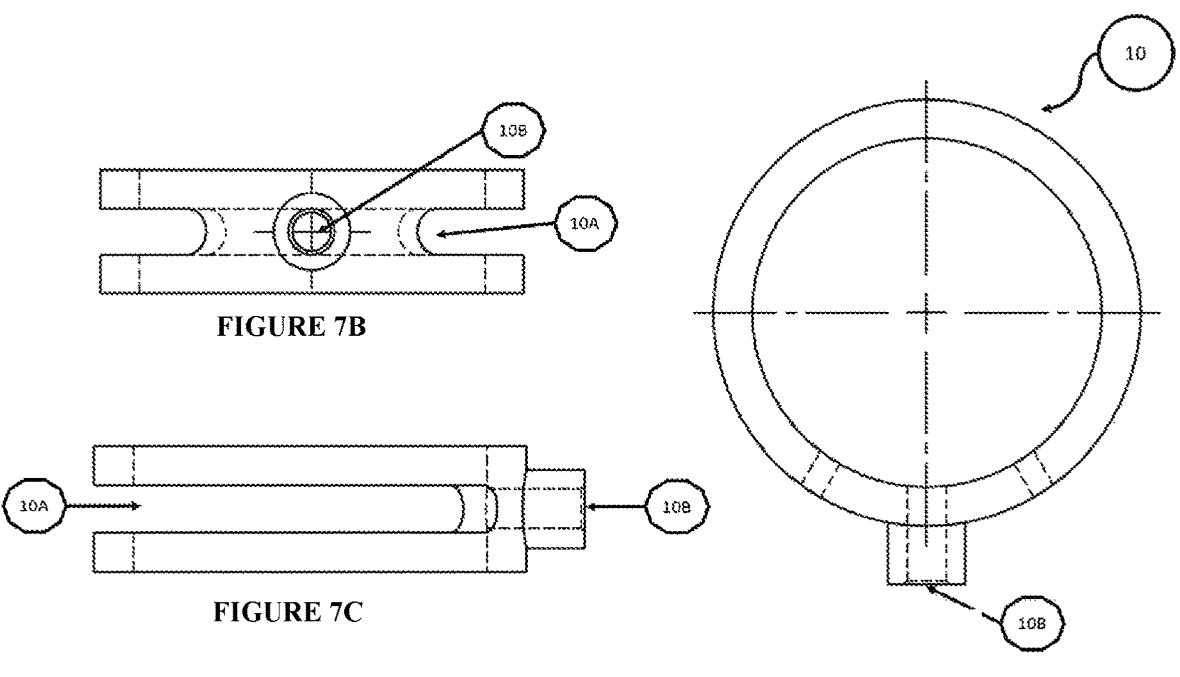
FIGURE 7B
FIGURE 7C
FIGURE 7D

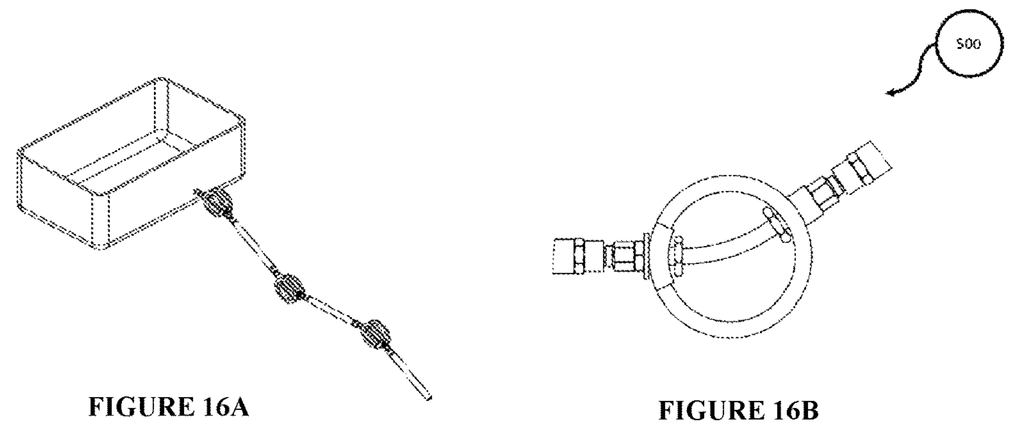
FIGURE 16A
FIGURE 16B
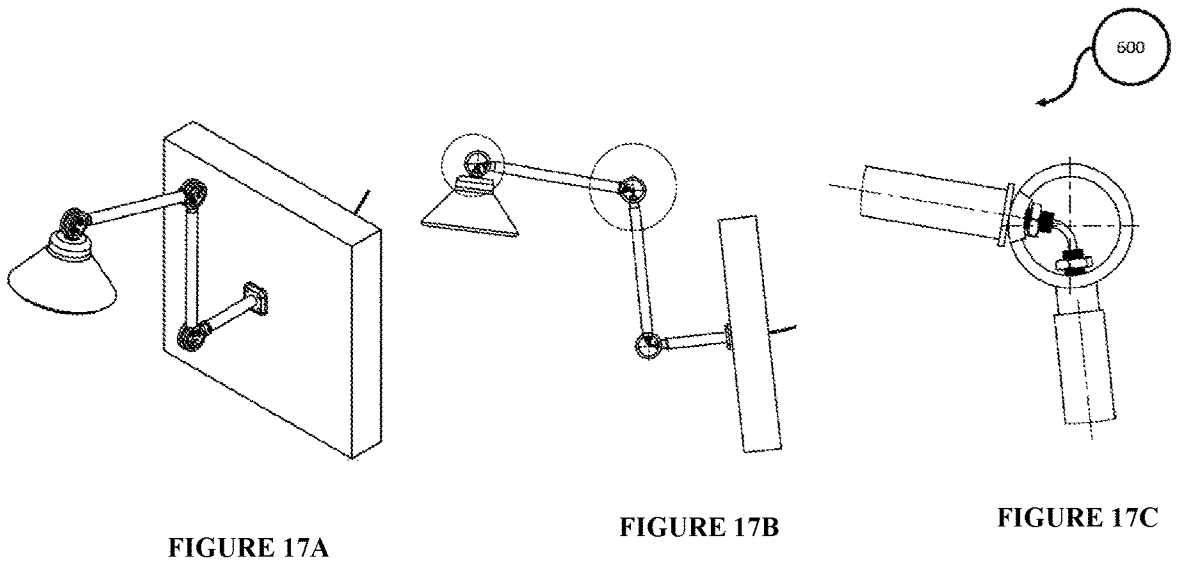
FIGURE 17A
FIGURE 17B
FIGURE 17C
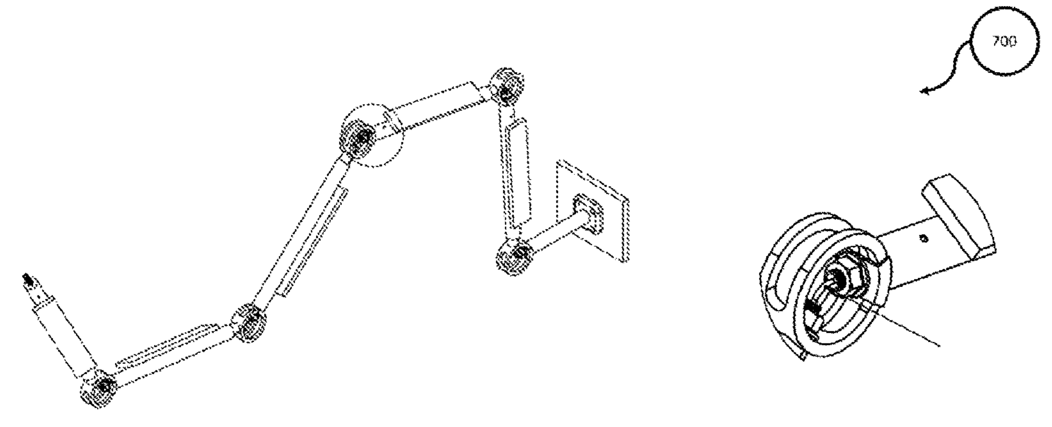
FIGURE 18A
FIGURE 18B

RING JOINT ASSEMBLY FOR CONNECTING OBJECTS ON SAME OR DIFFERENT PLANES AND A SYSTEM THEREOF

FIELD OF THE INVENTION

The present invention relates generally to a ring joint assembly connecting two things with each other and a ring joint assembled system wherein more than two things get connected to each other via more than one ring joint assemblies. Specifically, the invention relates to a ring joint assembly using two joints: a circular joint and a peripheral joint, by using a solid or a hollow bolt, as the case may be.

BACKGROUND OF THE INVENTION

Joint assemblies are widely used in the today's industry. Along with the extended use of nut, bolt and washer, the requirements for the joint assemblies have changed. The joint assembly need not only to be configured one set way. In order to provide for flexibility, movement, rotational capabilities and ease of adjustment, joint assemblies should provide room to manoeuvre.

An object of the present invention is to provide a ring joint assembly and a ring joint assembled system to connect two or more things or things on different planes.

Another object of the present invention is to provide a ring joint assembly and a ring joint assembled system capable of providing rotational capabilities to the things connected together using such assembly.

Yet another object of the present invention is to provide a ring joint assembly and a ring joint assembled system which is capable of easy adjustment, flexibility and ease of use.

Still another object of the present invention is to provide a ring joint assembly and a ring joint assembled system which is capable of safeguarding connection between electronic equipment, their wires, etc. by providing space through and inside of the joint assembly configuration to guide their movement/passage through such assembly as well as protecting from damage.

SUMMARY OF THE INVENTION

As shown is FIG. 1A, FIG. 1B, FIG. 2A and FIG. 2B, an isometric view of a ring joint assembly (100) in accordance with the present invention has been disclosed. The ring joint assembly (100) contains a ring (10) having a peripheral slot (10A) and a circular slot (10B), a support plate (20) having a circular slot (20A), hexagonal nut (30), washer (40) and solid bolts (50). On the other hand, ring joint assembly (100A) shown in FIG. 6A and FIG. 6B uses hollow bolts (60) in place of solid bolts (50) while the rest of the components remain the same.

The ring joint assembly (100) and (100A) facilitates connection of two things or things on two different planes, through the ring joint. For connecting any two things, one rigid connection must be made through the circular slot (10B) contained on the ring (10), along with washer (40), hexagonal nut (30) and solid (50) or hollow (60) bolts as the case may be. A movable connection through the peripheral slot (10A) on the ring (10), through the circular slot (20A) on the support plate (20), a washer (40), hexagonal nut (30) and solid (50) or hollow (60) bolts as the case may be, with the heads (50A) or (60A) of the solid (50) or hollow (60) bolts respectively placed inside the ring (10) or outside of it, must also be made, along with the rigid connection. This connection over the peripheral slot (10A) of the ring (10) helps in providing the much needed flexibility and easy adjustment of the connection. By coupling two joints: one through the circular slot (10B) on the ring (10) and one through the peripheral slot (10A) on the ring (10), one can make easy connections between things/things on different planes.

An illustration of the usage of hollow bolt (60) in the ring joint assembly can be seen in FIG. 14A, FIG. 14B, FIG. 15A, FIG. 15B, FIG. 15C, FIG. 16A and FIG. 16B. A hollow bolt (60) in place of solid bolt (50) may be used when there is a need to couple electronic appliances such as a Lamp (400), LED lights (500), wires, etc. or when things of smaller dimension such as a pipeline (300) can pass through such hollow bolts (60) or when there is a concern of space constraint or space management. The hollow bolt (60) provides a slot through which connecting wires/pipelines/etc. may be transferred from one thing to the other.

As can be seen in FIG. 1B, FIG. 2B and FIG. 5B, the head (50A) of the solid bolt (50) is held inside the ring (10), whereas in FIG. 1A, FIG. 2A and FIG. 5A, the head (50A) of the solid bolt (50) is held outside the ring (10). Similarly, it can be seen in FIG. 6B that the head (60A) of the hollow bolt (60) is held inside the ring (10), whereas in FIG. 6A, the head (60A) of the hollow bolt (60) is held outside the ring (10). The placement of the head (50A) of solid bolt (50) or head (60A) of hollow bolt (60) depends upon the availability of space, purpose of coupling, the things that need to be coupled together, etc.

A combination of one solid bolt (50) and one hollow bolt (60) may be used together in different combinations, in different connections (rigid or movable) and in different positions (the heads of solid (50A) and hollow (60A) placed inside the ring (10) or outside of it).

A ring joint assembled system, therefore, would consist of multiple such ring joint assemblies wherein several things would get connected via ring joints, in series with each other, in various combinations.

In a second embodiment (400) of the present invention, as disclosed in FIG. 15A and FIG. 15B, a camera can be connected to a base lock, via the ring joint assembly. As shown in the FIG. 15A, a camera first gets connected to a camera mount through camera knob, this camera mount, in turn, gets connected to the movable joint. The rigid joint, on the other hand, gets connected to the base lock.

Although the subject matter has been described in considerable detail with reference to certain preferred embodiments thereof, other embodiments are possible. As such, the spirit and scope of the appended claims should not be limited to the description of the preferred embodiment contained therein.

BRIEF DESCRIPTION OF THE DRAWINGS

Other aspects of the invention will become apparent by consideration of the accompanying drawings and their description stated below, which are merely illustrative of a preferred embodiment of the invention and do not limit in any way the nature and scope of the invention.

FIG. 1A illustrates an isometric front view of a ring joint assembly (100) in accordance with the present invention, wherein the heads of the solid bolts are outside the ring.

FIG. 1B illustrates an isometric front view of a ring joint assembly (100) in accordance with the present invention, wherein the heads of the solid bolts are inside the ring.

FIG. 2A illustrates another isometric view of a ring joint assembly (100) in accordance with the present invention, wherein the heads of the solid bolts are outside the ring.

FIG. 2B illustrates another isometric view of a ring joint assembly (100) in accordance with the present invention, wherein the heads of the solid bolts are inside the ring.

FIG. 5A illustrates a top view of a ring joint assembly (100) in accordance with the present invention, wherein the heads of the solid bolts are outside the ring.

FIG. 5B illustrates a top view of a ring joint assembly (100) in accordance with the present invention, wherein the heads of the solid bolts are inside the ring.

FIG. 6A illustrates a sectional top view of a ring joint assembly (100A) in accordance with the present invention, wherein the heads of the hollow bolts are outside the ring.

FIG. 6B illustrates a sectional top view of a ring joint assembly (100A) in accordance with the present invention, wherein the heads of the hollow bolts are inside the ring.

FIG. 7A illustrates an isometric view of a ring (10) in accordance with the present invention.

FIG. 7B illustrates a front view of a ring (10) in accordance with the present invention.

FIG. 7C illustrates a side view of a ring (10) in accordance with the present invention.

FIG. 7D illustrates a top view of a ring (10) in accordance with the present invention.

FIG. 16A illustrates an isometric view of a Tank using ring joint assembled system (500) to couple a pipeline to it, as a working example of the present invention.

FIG. 16B illustrates a detailed side view of the Tank ring joint assembled system (500) wherein hollow bolts have been used to pass pipeline through them, as a working example of the present invention.

FIG. 17A and FIG. 17B illustrates an isometric view and a side view of a Lamp using ring joint assembled system (600) to connect wires to it, as a working example of the present invention.

FIG. 17C illustrates a detailed side view of the Lamp ring joint assembled system (600) wherein hollow bolts have been used to pass wire through them, as a working example of the present invention.

FIG. 18A illustrates an isometric view of a series of LED lights using ring joint assembled system (700), as a working example of the present invention.

FIG. 18B illustrates a detailed isometric view of the LED ring joint assembled system (700) wherein hollow bolts have been used to pass LED wires through them, as a working example of the present invention.

DETAILED DESCRIPTION OF THE PREFERRED EMBODIMENTS

Figures 3A, 3B, 4A, 4B:
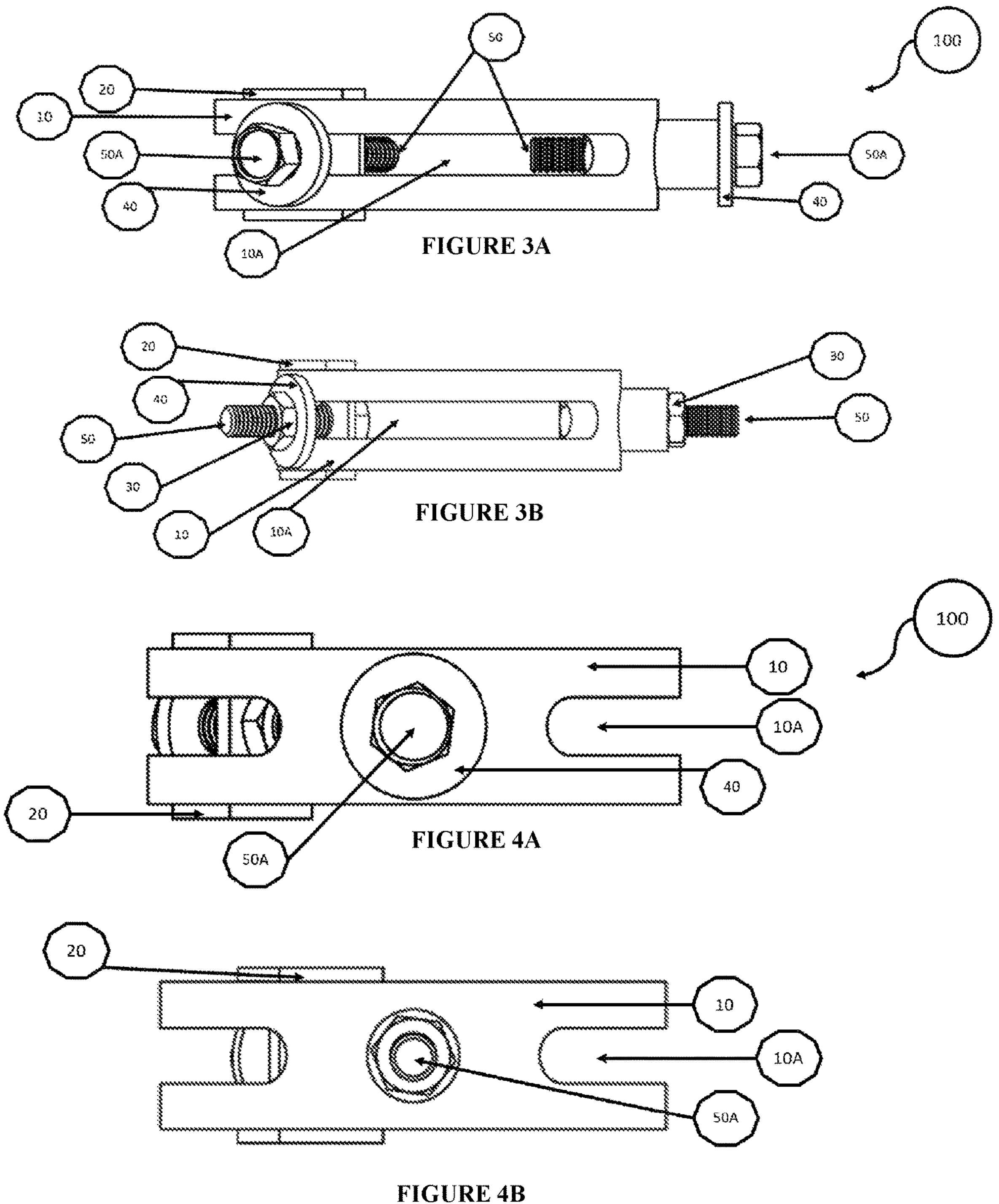
FIG. 3A illustrates a front view of a ring joint assembly (100) in accordance with the present invention, wherein the heads of the solid bolts are outside the ring.
FIG. 3B illustrates a front view of a ring joint assembly (100) in accordance with the present invention, wherein the heads of the solid bolts are inside the ring.
FIG. 4A illustrates a side view of a ring joint assembly (100) in accordance with the present invention, wherein the heads of the solid bolts are outside the ring.
FIG. 4B illustrates a side view of a ring joint assembly (100) in accordance with the present invention, wherein the heads of the solid bolts are inside the ring.

The invention will now be described with reference to the accompanying drawings which do not limit the scope and ambit of the invention. The description provided is purely by way of example and illustration.

FIG. 1A illustrates an isometric front view of a ring joint assembly (100) in accordance with the present invention. The ring joint assembly (100) contains a ring (10) having a peripheral slot (10A) and a circular slot (10B), a support plate (20) having a circular slot (20A), hexagonal nut (30), washer (40) and solid bolts (50). The ring joint assembly (100) facilitates coupling of two things or two planes. For connecting any two things or planes, one rigid connection is to be made through the circular slot (10B) contained on the ring (10), along with washer (40), hexagonal nut (30) and solid (50) bolts. A second movable connection through the peripheral slot (10A) on the ring (10), through the circular slot (20A) on the support plate (20), a washer (40), hexagonal nut (30) and solid (50) bolts, with the heads (50A) of the solid (50) bolts placed outside of the ring (10), is to be made, along with the rigid connection. This connection over the peripheral slot (10A) of the ring (10) helps in providing the much needed flexibility and easy adjustment of the connection between things on two different planes or between two different things. By coupling two joints: one through the circular slot (10B) on the ring (10) and one through the peripheral slot (10A) on the ring (10), one can make easy connections between things/planes.

FIG. 1B illustrates an isometric front view of a ring joint assembly (100) in accordance with the present invention. This isometric front view comprises of the same components as depicted in FIG. 1A which are herein incorporated by reference. One notable difference with regard to the placement of heads (50A) of the solid bolts (50) can be found in this view, such that the heads (50A) of the solid bolts (50) are placed inside the ring (10). Other components being the same, the working of the ring joint assembly (100) disclosed in this view is the same as that of disclosed in FIGS. 1A and 1*s* herein incorporated by reference.

FIG. 2A illustrates another isometric view of a ring joint assembly (100) in accordance with the present invention. This isometric front view comprises of the same components as depicted in FIG. 1A which are herein incorporated by reference. Other components being the same, the working of the ring joint assembly (100) disclosed in this view is the same as that of disclosed in FIGS. 1A and 1*s* herein incorporated by reference.

FIG. 2B illustrates an isometric front view of a ring joint assembly (100) in accordance with the present invention. This isometric front view comprises of the same components as depicted in FIG. 1A which are herein incorporated by reference. One notable difference with regard to the placement of heads (50A) of the solid bolts (50) can be found in this view, such that the heads (50A) of the solid bolts (50) are placed inside the ring (10). Other components being the same, the working of the ring joint assembly (100) disclosed in this view is the same as that of disclosed in FIGS. 1A and 1*s* herein incorporated by reference.

FIG. 3A illustrates a front view of a ring joint assembly (100) in accordance with the present invention. This front view comprises of the same components as depicted in FIG. 1A which are herein incorporated by reference. Other components being the same, the working of the ring joint assembly (100) disclosed in this view is the same as that of disclosed in FIGS. 1A and 1*s* herein incorporated by reference.

FIG. 3B illustrates a front view of a ring joint assembly (100) in accordance with the present invention. This front view comprises of the same components as depicted in FIG. 1A which are herein incorporated by reference. One notable difference with regard to the placement of heads (50A) of the solid bolts (50) can be found in this view, such that the heads (50A) of the solid bolts (50) are placed inside the ring (10). Other components being the same, the working of the ring joint assembly (100) disclosed in this view is the same as that of disclosed in FIGS. 1A and 1*s* herein incorporated by reference.

FIG. 4A illustrates a side view of a ring joint assembly (100) in accordance with the present invention. This side view comprises of the same components as depicted in FIG. 1A which are herein incorporated by reference. Other components being the same, the working of the ring joint assembly (100) disclosed in this view is the same as that of disclosed in FIGS. 1A and 1*s* herein incorporated by reference.

FIG. 4B illustrates a side view of a ring joint assembly (100) in accordance with the present invention. This side view comprises of the same components as depicted in FIG. 1A which are herein incorporated by reference. One notable difference with regard to the placement of heads (50A) of the solid bolts (50) can be found in this view, such that the heads (50A) of the solid bolts (50) are placed inside the ring (10). Other components being the same, the working of the ring joint assembly (100) disclosed in this view is the same as that of disclosed in FIGS. 1A and 1*s* herein incorporated by reference.

FIG. 5A illustrates a top view of a ring joint assembly (100) in accordance with the present invention. This top view comprises of the same components as depicted in FIG. 1A which are herein incorporated by reference. Other components being the same, the working of the ring joint assembly (100) disclosed in this view is the same as that of disclosed in FIGS. 1A and 1*s* herein incorporated by reference.

FIG. 5B illustrates a top view of a ring joint assembly (100) in accordance with the present invention. This top view comprises of the same components as depicted in FIG. 1A which are herein incorporated by reference. One notable difference with regard to the placement of heads (50A) of the solid bolts (50) can be found in this view, such that the heads (50A) of the solid bolts (50) are placed inside the ring (10). Other components being the same, the working of the ring joint assembly (100) disclosed in this view is the same as that of disclosed in FIGS. 1A and 1*s* herein incorporated by reference.

FIG. 6A illustrates a sectional top view of a ring joint assembly (100A) in accordance with the present invention. This sectional top view comprises of the same components as depicted in FIG. 1A with the exception of hollow bolts (60) that have been used in place of solid bolts (50). Other components depicted in FIG. 1A are herein incorporated by reference. Other components being the same, the working of the ring joint assembly (100A) disclosed in this view is the same as that of the ring joint assembly (100) disclosed in FIGS. 1A and 1*s* herein incorporated by reference.

FIG. 6B illustrates a sectional top view of a ring joint assembly (100A) in accordance with the present invention. This sectional top view comprises of the same components as depicted in FIG. 6A which are herein incorporated by reference. One notable difference with regard to the placement of heads (60A) of the hollow bolts (60) can be found in this view, such that the heads (60A) of the hollow bolts (60) are placed inside the ring (10). Other components being the same, the working of the ring joint assembly (100A) disclosed in this view is the same as that of disclosed in FIG. 6A and is herein incorporated by reference.

FIG. 7A, FIG. 7B, FIG. 7C and FIG. 7D illustrates an isometric view, a front view, a side view and a top view of a ring (10) respectively in accordance with the present invention. The ring (10) has a peripheral slot (10A) and a circular slot (10B). The ring (10) is used in conjunction with other components in a ring joint assembly (100) or (100A) to couple two things or two planes.

FIG. 8A, FIG. 8B, FIG. 8C, FIG. 8D and FIG. 8E illustrates a front view, a left-side view, a right-side view, a top view and an isometric view of a support plate (20) respectively in accordance with the present invention. The support plate (20) has a circular slot (20A) which is used in conjunction with other components in a ring joint assembly (100) or (100A) to form a movable connection in order to couple two things or two planes.

Figures 8A, 8B, 8C, 8D, 8E, 9A, 9B, 9C, 10A, 10B, 10C:
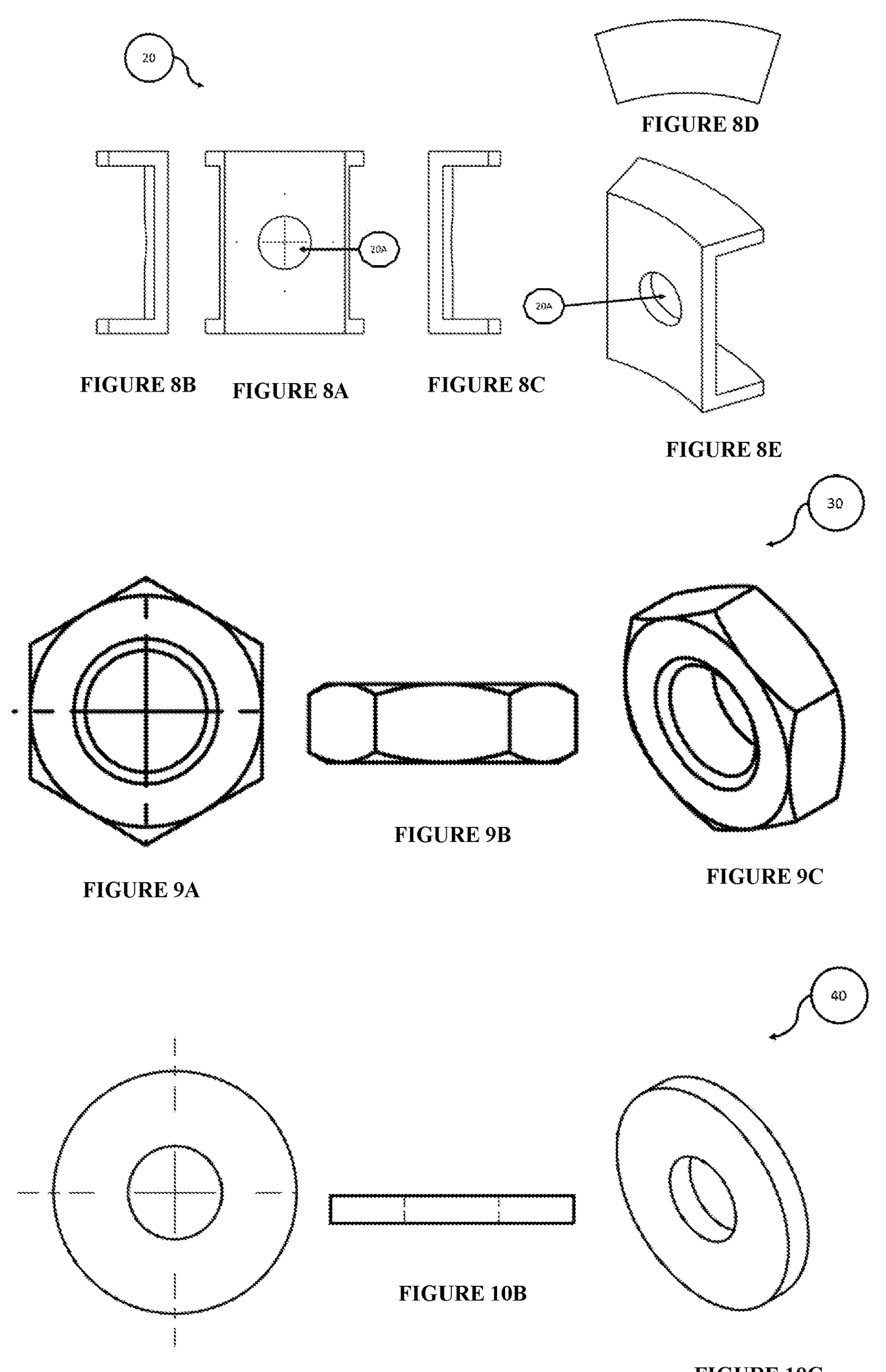
FIG. 8A, FIG. 8B, FIG. 8C, FIG. 8D and FIG. 8E illustrates a front view, a left-side view, a right-side view, a top view and an isometric view of a support plate (20) respectively in accordance with the present invention.
FIG. 9A, FIG. 9B and FIG. 9C illustrates a top view, a front view and an isometric view of a hexagonal nut (30) respectively, in accordance with the present invention.
FIG. 10A, FIG. 10B and FIG. 10C illustrates a top view, a front view and an isometric view of a washer (40) respectively, in accordance with the present invention.

FIG. 9A, FIG. 9B and FIG. 9C illustrates a top view, a front view and an isometric view of a hexagonal nut (30) respectively, in accordance with the present invention. The hexagonal nut (30) is used in conjunction with other components in a ring joint assembly (100) or (100A) to form a rigid and/or a movable connection in order to couple two things or two planes.

FIG. 10A, FIG. 10B and FIG. 10C illustrates a top view, a front view and an isometric view of a washer (40) respectively, in accordance with the present invention. The washer (40) is used in conjunction with other components in a ring joint assembly (100) or (100A) to form a rigid and/or a movable connection in order to couple two things or two planes.

Figures 11A, 11B, 11C, 12A, 12B, 13A, 13B, 13C:
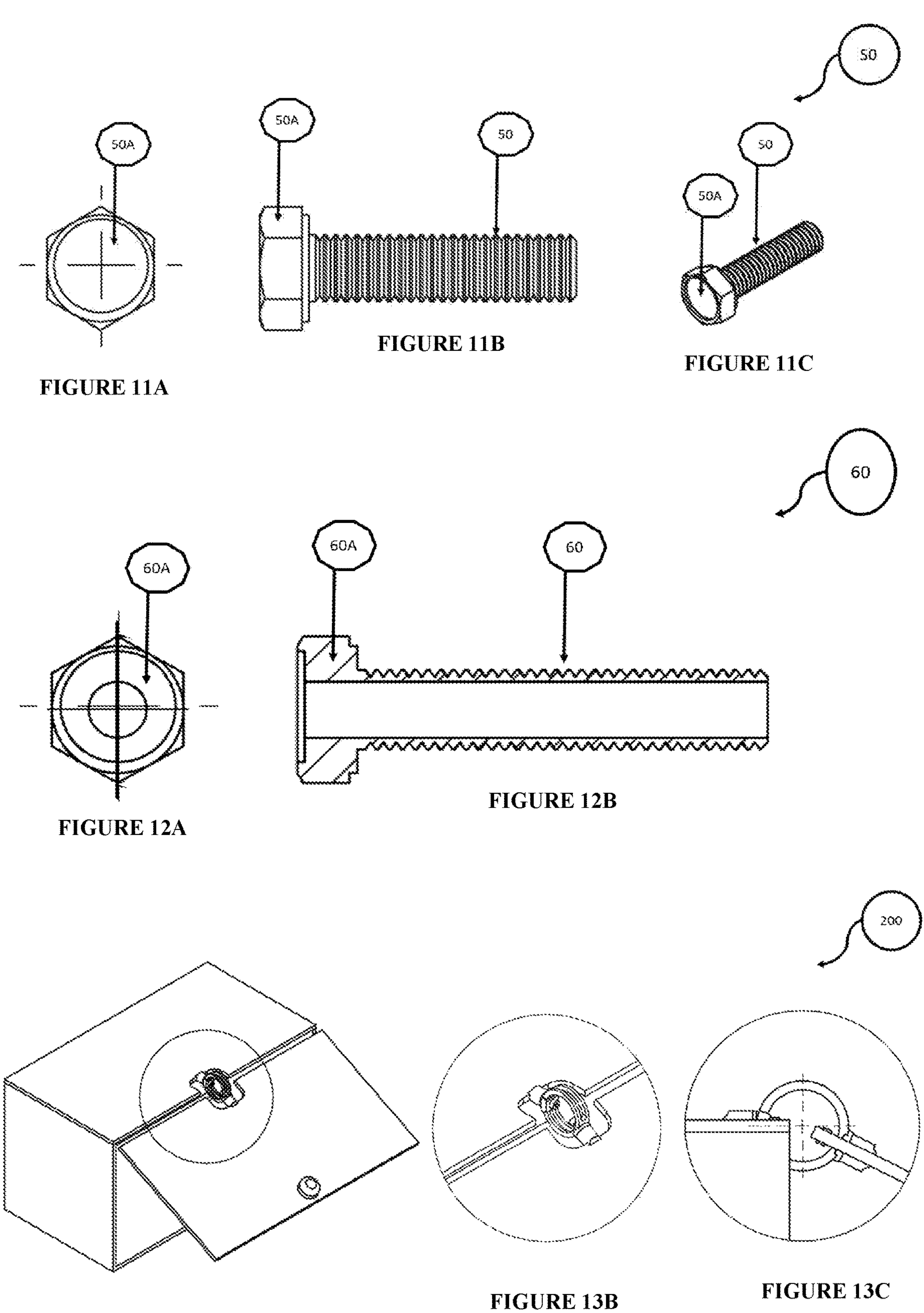
FIG. 11A, FIG. 11B and FIG. 11C illustrates a top view, a side view and an isometric view of a solid bolt (50) respectively, in accordance with the present invention.
FIG. 12A and FIG. 12B illustrates a top view and a sectional side view of a hollow bolt (60) respectively, in accordance with the present invention.
FIG. 13A, FIG. 13B and FIG. 13C illustrates an isometric view, a detailed isometric view and a side view of a Box using ring joint assembly (200) to couple two sides of it, as a working example of the present invention.

FIG. 11A, FIG. 11B and FIG. 11C illustrates a top view, a side view and an isometric view of a solid bolt (50) respectively, in accordance with the present invention. The head of the solid bolt (50) is depicted by the reference numeral 50A. The solid bolt (50) is used in conjunction with other components in a ring joint assembly (100) to form a rigid and/or a movable connection in order to couple two things or two planes. The solid bolt (50) may also be used in other combinations along with hollow bolt (60), depending upon the use, purpose and application of a product.

FIG. 12A and FIG. 12B illustrates a top view and a sectional side view of a hollow bolt (60) respectively, in accordance with the present invention. The head of the hollow bolt (60) is depicted by the reference numeral 60A. The hollow bolt (60) is used in conjunction with other components in a ring joint assembly (100A) to form a rigid and/or a movable connection in order to couple two things or two planes. The hollow bolt (60) may also be used in other combinations along with solid bolt (50), depending upon the use, purpose and application of a product.

FIG. 13A, FIG. 13B and FIG. 13C illustrates an isometric view, a detailed isometric view and a side view of a Box using ring joint assembly (200) to couple two sides of it, as a working example of the present invention.

Figures 14A, 14B, 14C, 15A, 15B, 15C, 15D, 15E:
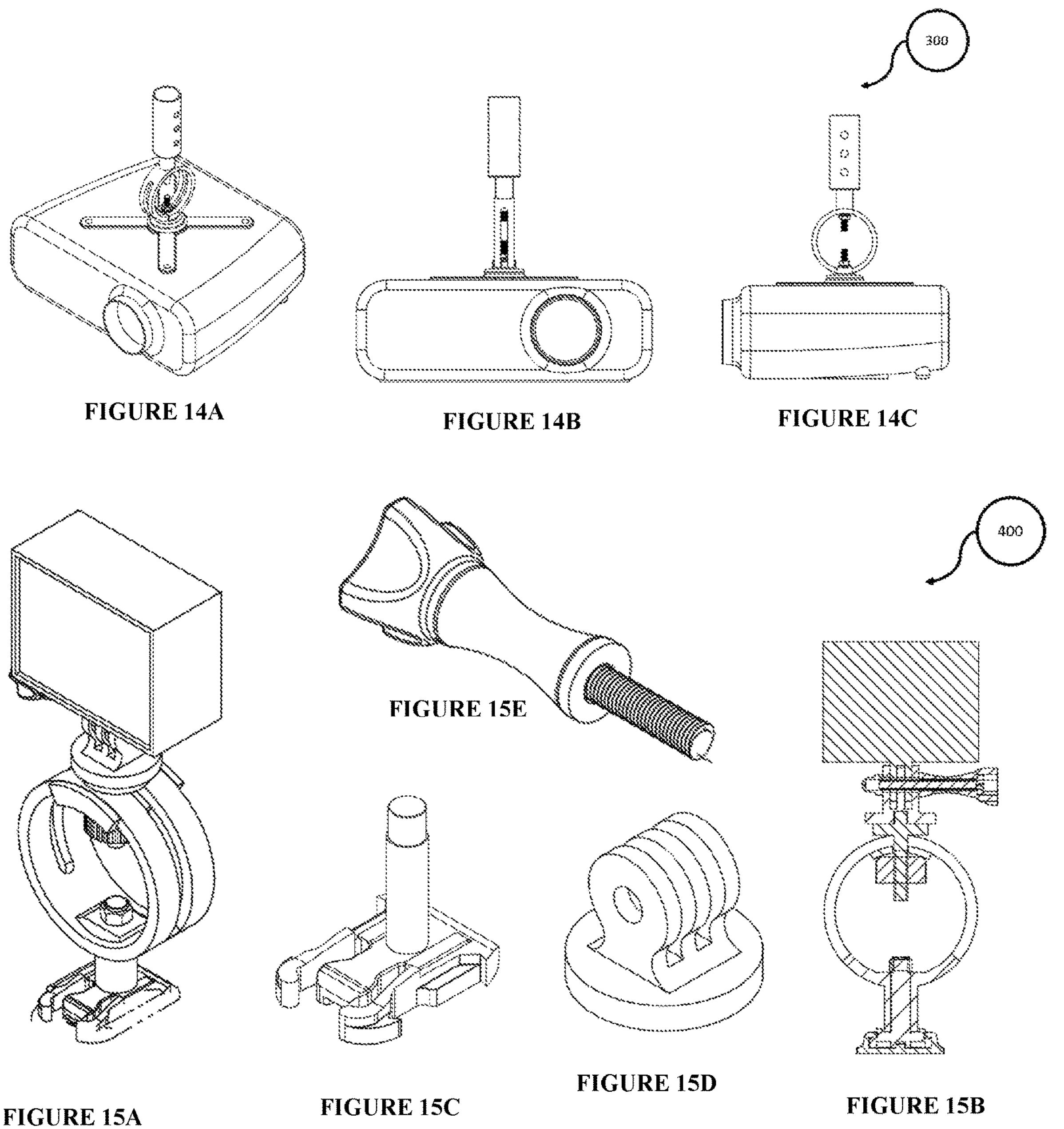
FIG. 14A, FIG. 14B and FIG. 14C illustrates an isometric view, a front view and a side view of a Projector using ring joint assembly (300) to couple a stand to it, as a working example of the present invention.
FIG. 15A illustrates an isometric view of a second embodiment of the present invention (400), wherein a camera gets connected to its stand via a camera mount and the ring joint assembly.
FIG. 15B illustrates a front view of a second embodiment of the present invention (400), wherein a camera gets connected to its stand via a camera mount and the ring joint assembly.
FIG. 15C illustrates an isometric view of a Base lock for the Camera assembly (400).
FIG. 15D illustrates an isometric view of a Camera Mount for the Camera assembly (400).
FIG. 15E illustrates an isometric view of a Camera Knob for the Camera assembly (400).

FIG. 14A, FIG. 14B and FIG. 14C illustrates an isometric view, a front view and a side view of a Projector using ring joint assembly (300) to couple a stand to it, as a working example of the present invention.

FIG. 15A illustrates an isometric view of a second embodiment of the present invention, depicted by reference numeral 400, wherein a camera gets connected to a base lock, via a camera mount and a ring joint assembly. A camera bolt gets inserted, simultaneously into a camera and a camera mount, and gets locked. This camera mount, in turn, gets connected to the movable joint. The rigid joint, on the other hand, gets connected to the base lock. FIG. 15B illustrates a front view of the camera assembly (400). FIG. 15C, FIG. 15D and FIG. 15E, illustrates an isometric view of a Base lock, a Camera Mount and a Camera Knob, respectively for the camera assembly (400).

FIG. 16A illustrates an isometric view of a Tank using ring joint assembled system (500) to couple a pipeline to it, as a working example of the present invention. FIG. 16B illustrates a detailed side view of the Tank ring joint assembled system (500) wherein hollow bolts have been used to pass pipeline through them, as a working example of the present invention.

FIG. 17A and FIG. 17B illustrates an isometric view and a side view of a Lamp using ring joint assembled system (600) to connect wires to it, as a working example of the present invention. FIG. 17C illustrates a detailed side view of the Lamp ring joint assembled system (600) wherein hollow bolts have been used to pass wire through them, as a working example of the present invention.

FIG. 18A illustrates an isometric view of a series of LED lights using ring joint assembled system (700), as a working example of the present invention. FIG. 18B illustrates a detailed isometric view of the LED ring joint assembled system (700) wherein hollow bolts have been used to pass LED wires through them, as a working example of the present invention.

LIST OF REFERENCE SYMBOL

10—Ring
10A—Peripheral Slot on Ring
10B—Circular Slot on Ring
20—Support Plate
20A—Circular Slot on Support Plate
30—Hexagonal Nut
40—Washer
50—Solid Bolt
50A—Head of the Solid Bolt
60—Hollow Bolt
60A—Head of the Hollow Bolt
100—Ring Joint Assembly using Solid Bolts
100A—Ring Joint Assembly using Hollow Bolts
200—A box using ring joint assembly to couple two sides
300—A Projector using ring joint assembly to couple a stand to it
400—A camera using ring joint assembly to couple a baselock to it
500—A Tank using ring joint assembled system with hollow bolts, to couple a pipeline to it
600—A Lamp using ring joint assembled system with hollow bolts, to connect wires to it
700—LED lights using ring joint assembled system with hollow bolts

We claim:

1. A ring joint assembly for connecting first and second objects on same or different planes, the ring joint assembly comprising:
a ring having a peripheral slot and a fixed circular slot,
a support plate having a circular slot,
a first bolt having a first head and a second bolt having a second head, and
a first nut and a second nut,
wherein a rigid connection with the first object is made by the first bolt passing through the fixed circular slot of the ring and engaging with the first nut, and
wherein a movable connection with the second object is made by the second bolt passing through the circular slot of the support plate and the peripheral slot of the ring, and engaging with the second nut.

2. The ring joint assembly as claimed in claim 1, the ring joint assembly further comprising:
a first washer and a second washer, wherein:
the first bolt is passed through the first washer, the first nut and the first bolt, such that the rigidity of the rigid connection is determined by tightening or loosening of the first nut over the first bolt; and
the second bolt is passed through the second washer, the second nut and the second bolt, such that the rigidity of the movable connection is determined by tightening or loosening of the second nut over the second bolt.

3. The ring joint assembly as claimed in claim 2, wherein the first head and the second head are placed outside or inside of the ring.

4. The ring joint assembly as claimed in claim 2, wherein the first bolt and the second bolt are selected from the group consisting of a solid bolt and a hollow bolt.

5. The ring joint assembly as claimed in claim 1, wherein the first head or the second head is placed outside or inside of the ring.

6. The ring joint assembly as claimed in claim 1, wherein the first object and the second object are elected from the group consisting of a wire or a pipe.

7. A ring joint assembled system, comprising a plurality of ring joint assemblies as claimed in claim 1 connecting, in series, more than two things with each other via multiple of said ring joint assemblies.

* * * * *